(12) United States Patent
Iwasaki et al.

(10) Patent No.: US 11,614,129 B2
(45) Date of Patent: Mar. 28, 2023

(54) AUTOMATIC TRANSMISSION

(71) Applicant: Mazda Motor Corporation, Hiroshima (JP)

(72) Inventors: Tatsuhiko Iwasaki, Aki-gun (JP); Tatsutoshi Mizobe, Aki-gun (JP); Yoshihiko Fujita, Aki-gun (JP); Keiichi Nakamura, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/452,921

(22) Filed: Oct. 29, 2021

(65) Prior Publication Data

US 2022/0154781 A1 May 19, 2022

(30) Foreign Application Priority Data

Nov. 13, 2020 (JP) .............................. JP2020-189742

(51) Int. Cl.
*F16D 13/52* (2006.01)
*F16D 25/0638* (2006.01)
*F16D 21/00* (2006.01)

(52) U.S. Cl.
CPC .......... *F16D 25/0638* (2013.01); *F16D 13/52* (2013.01); *F16D 21/00* (2013.01)

(58) Field of Classification Search
CPC .......... F16D 25/0638; F16D 2021/0661; F16D 25/10; F16D 13/52; F16D 13/69; F16D 13/648

See application file for complete search history.

(56) References Cited

U.S. PATENT DOCUMENTS

2020/0386278 A1* 12/2020 Elsesser ................. F16D 13/69

FOREIGN PATENT DOCUMENTS

| CN | 107339553 U | * | 5/2018 | |
| DE | 102013216333 A1 | * | 2/2015 | ............. F16D 21/06 |
| DE | 102015215962 A1 | * | 2/2017 | ............. F16D 13/58 |
| DE | 102017127110 A1 | * | 1/2019 | |
| JP | 2017166679 A | | 9/2017 | |

* cited by examiner

*Primary Examiner* — Stacey A Fluhart
(74) *Attorney, Agent, or Firm* — Alleman Hall Creasman & Tuttle LLP

(57) ABSTRACT

The automatic transmission has, on an axis of a power transmission shaft: a one-side clutch including a plurality of friction plates; and an other-side clutch including a plurality of friction plate. A pressing section of a piston of the one-side clutch and a pressing section of a piston of the other-side clutch are arranged to overlap each other in an axial direction. On one side in the axial direction of the plurality of friction plates of the one-side clutch, a radial section of the piston of the one-side clutch and a radial section of the piston of the other-side clutch are arranged in parallel in the axial direction. Pressure-receiving sections of the pistons of the one-side clutch and the other-side clutch and bearing sections of the pistons of the one-side clutch and the other-side clutch are aggregated and arranged on a radially inner side.

15 Claims, 3 Drawing Sheets

AUTOMATIC TRANSMISSION

TECHNICAL FIELD

The present invention relates to an automatic transmission that is mounted on a vehicle.

BACKGROUND ART

An automatic transmission that is mounted on a vehicle such as an automobile is configured to switch a power transmission path including a planetary gear set and the like by means of selective engagement of a plurality of friction engagement elements including a clutch, a brake, and the like, and thereby achieves a specified gear shift stage according to a driving state of the vehicle.

The clutch that is used in such an automatic transmission is generally provided with a clutch drum, a clutch hub, a plurality friction plates arranged between the clutch drum and the clutch hub, a piston pressing the plurality of friction plates, and a hydraulic chamber supplied with hydraulic oil to urge the piston in a friction plate direction.

The hydraulic chamber rotates with the clutch drum and the clutch hub. Thus, there is a case where the piston moves in the friction plate direction by a centrifugal force (hereinafter also referred to as a centrifugal hydraulic pressure) that is applied to the hydraulic oil remaining in the hydraulic chamber even during disengagement of the clutch. In order to prevent unnecessary engagement during the disengagement, there is a clutch that includes a cancellation chamber to cancel the centrifugal hydraulic pressure on an opposite side of the piston from the hydraulic chamber.

By the way, there is a tendency that the number of the planetary gear sets constituting a gear shift mechanism is increased to increase gear shift stages of the automatic transmission for purposes of improving fuel efficiency and the like of the vehicles. However, when the number of the planetary gear sets is increased, an axial dimension and a radial dimension of the entire transmission are increased, which produces a problem of mountability.

Meanwhile, like a clutch disclosed in JP2017-166679A, a clutch that is configured to arrange a bearing between the piston and the friction plate and transmits a hydraulic pressure applied to the piston to the friction plate via the bearing has been known. According to the clutch disclosed in JP2017-166679A, the hydraulic chamber and the piston are non-rotational sections. Thus, the centrifugal hydraulic pressure is not applied to the hydraulic chamber, movement of the piston in the friction plate direction during the disengagement is prevented, and the cancellation chamber becomes unnecessary. Thus, the axial dimension of the automatic transmission for providing the cancellation chamber is easily reduced.

SUMMARY OF THE INVENTION

Problem to be Solved by the Invention

However, JP2017-166679A does not disclose an automatic transmission that includes a plurality of friction engagement elements and a plurality of planetary gear sets. For example, there is room for improvement in reduction of the axial dimension of the automatic transmission in the case where the friction plates in the clutches are aligned in the axial direction in order to suppress an increase in the radial dimension.

The present disclosure has a purpose of providing an automatic transmission which has a plurality of clutches and an axial dimension of the plurality of clutches is reduced.

Means for Solving the Problem

In order to solve the above problem, an automatic transmission according to the present disclosure is configured as follows.

The present disclosure provides an automatic transmission having, on an axis of a power transmission shaft: a one-side clutch that includes a plurality of friction plates arranged on one side in an axial direction; and an other-side clutch that includes, on another side in the axial direction of the plurality of friction plates, a plurality of friction plates aligned in the axial direction. wherein Each of the one-side clutch and the other-side clutch respectively includes: a drum member with which the plurality of friction plates are engaged in an axially slidable manner; a hub member with which the plurality of friction plates are engaged in the axially slidable manner on a radially inner side of the drum member; a piston that presses the plurality of friction plates from the one side in the axial direction; and a hydraulic chamber to which hydraulic oil used to urge the piston in a direction toward the plurality of friction plates is supplied. Each of the pistons of the one-side clutch and the other-side clutch respectively includes a pressing section that extends in the axial direction to press the plurality of friction plates; a radial section that extends radially inward from the one side in the axial direction of the pressing section; a pressure-receiving section that receives a pressure of the hydraulic oil supplied to the hydraulic chamber; and a bearing section that is arranged between the radial section and the pressure-receiving section. The pressing section of the one-side clutch and the pressing section of the other-side clutch are arranged to overlap each other in the axial direction. On the one side in the axial direction of the plurality of friction plates of the one-side clutch, the radial section of the one-side clutch and the radial section of the other-side clutch are arranged in parallel in the axial direction. The pressure-receiving section of the one-side clutch, the pressure-receiving section of the other-side clutch, the bearing section of the one-side clutch, and the bearing section of the other-side clutch are aggregated and arranged on a radially inner side.

According to the present disclosure, the piston is divided into the fixed pressure-receiving section and a pair of the pressing section and the radial section that are rotatable, and a hydraulic pressure that is applied to the pressure-receiving section can be transmitted to the pressing section via the bearing section. Thus, the hydraulic chamber does not have to rotate. In this way, there is no need to provide a cancellation chamber for canceling a centrifugal hydraulic pressure that is applied to the hydraulic oil in the hydraulic chamber by the rotation of the hydraulic chamber. Therefore, it is possible to suppress an increase in an axial dimension to secure the cancellation chamber.

In addition, the pressure-receiving sections and the bearing sections are aggregated and arranged on the radially inner side of the pressing sections. Thus, at radial positions of the friction plates, only the radial sections of the one-side clutch and the other-side clutch can be arranged in parallel on the one side in the axial direction. In this way, compared to a case where the bearing section is arranged between the pressing section and the friction plates, an axial dimension of a portion in which the friction plates are arranged can easily be reduced.

Here, the bearing sections is arranged on the radially inner side of the pressing section of the piston. Thus, compared to a case where the bearing section is arranged between the pressing section and the friction plate, a circumferential velocity of the bearing section is reduced. As a result, it is possible to suppress running out of the oil in the bearing section, and the like.

The other-side clutch may be a first other-side clutch that is arranged on the one-side clutch side, and the automatic transmission may further include a second other-side clutch that is arranged on the other side in the axial direction of the first other-side clutch.

With this configuration, also in an automatic transmission that includes three clutches, it is possible to suppress an increase in an axial dimension of the plurality of clutches.

The piston of the other-side clutch may penetrate the plurality of friction plates of the one-side clutch in the axial direction.

With this configuration, the plurality of other-side friction plates can be pressed by the piston, which is arranged on the one side in the axial direction of the plurality of one-side friction plates, in the other-side clutch while the friction plates of the one-side clutch and the other-side clutch are arranged in parallel in the axial direction.

The drum member of the one-side clutch may include a drum radial section that extends radially inward, and an end portion of the drum radial section may be fixed to a transmission case via a bearing.

With this configuration, an axial load that the drum member receives from the piston via the plurality of friction plates is transmitted to an inner end portion of the drum radial section. The load that is transmitted to the inner end portion of the drum radial section can be received by the transmission case via the bearing.

Accordingly, the axial load that is applied to the drum member is not transmitted to another rotary element. Thus, it is possible to eliminate an arrangement space for the bearing or the like that is necessary when the axial load is transmitted to the other rotary element. More specifically, in the case where the axial load is transmitted to the other rotary element, the axial load is transmitted to the case while the bearing or the like is arranged to bear the axial load transmitted to the other rotary element. However, according to the present disclosure, the axial load that is applied to the drum member is not transmitted to the other rotary element. Thus, there is no need to arrange an unnecessary load bearing member.

The drum member of the one-side clutch may include: a cylindrical section with which the plurality of friction plates are engaged; a first radial section that extends radially inward from an end portion on the one side in the axial direction of the cylindrical section; an axial section that extends to the other side in the axial direction from an end portion on the radially inner side of the first radial section; and a second radial section that further extends radially inward from an end portion on the other side in the axial direction of the axial section. The axial section may penetrate the radial section of the piston.

With this configuration, it is configured to provide the axial section in the drum member and that the drum member penetrates the radial section of the piston. Accordingly, compared to a case where the drum member only has the radial section that extends in the radial direction from the cylindrical section, it is possible to incline the radial section of the piston from the other side in the axial direction to the one side in the axial direction in a direction from the radially outer side toward the radially inner side within a specified axial dimension.

In this way, for example, compared to a case where the radial section of the piston extends along the radial direction in a manner to be orthogonal to the axial direction, an angle defined by the pressing section and the radial section can be increased. Thus, bending deformation of the pressing section of the piston can easily be suppressed.

An urging member that urges the piston to the one side in the axial direction may be arranged between an adjacent pair of outer friction plates engaged with the drum member of the other-side clutch.

With this configuration, for example, compared to a case where a return spring that urges the piston to the one side in the axial direction is arranged on the one side in the axial direction, the axial dimension can be reduced.

A first penetration position, at which the piston of the first other-side clutch penetrates the plurality of friction plates of the one-side clutch, and a second penetration position, at which the piston of the second other-side clutch penetrates the plurality of friction plates of the one-side clutch, may be misaligned in a circumferential direction.

With this configuration, for example, in the case where a through hole is provided to cause each of the pistons to penetrate the plurality of friction plates, it is possible to suppress a lack of rigidity of the plurality of friction plates in the one-side clutch in comparison with a case where the through holes for the piston of the first other-side clutch and the piston of the second other-side clutch are provided at the same circumferential positions in the plurality of friction plates of the one-side clutch.

Advantage of the Invention

According to the present disclosure, it is possible to provide the automatic transmission that includes the plurality of clutches and in which the axial dimension of the plurality of clutches is reduced.

MODES FOR CARRYING OUT THE INVENTION

A description will hereinafter be made on an embodiment of the present disclosure.

Figure 1:
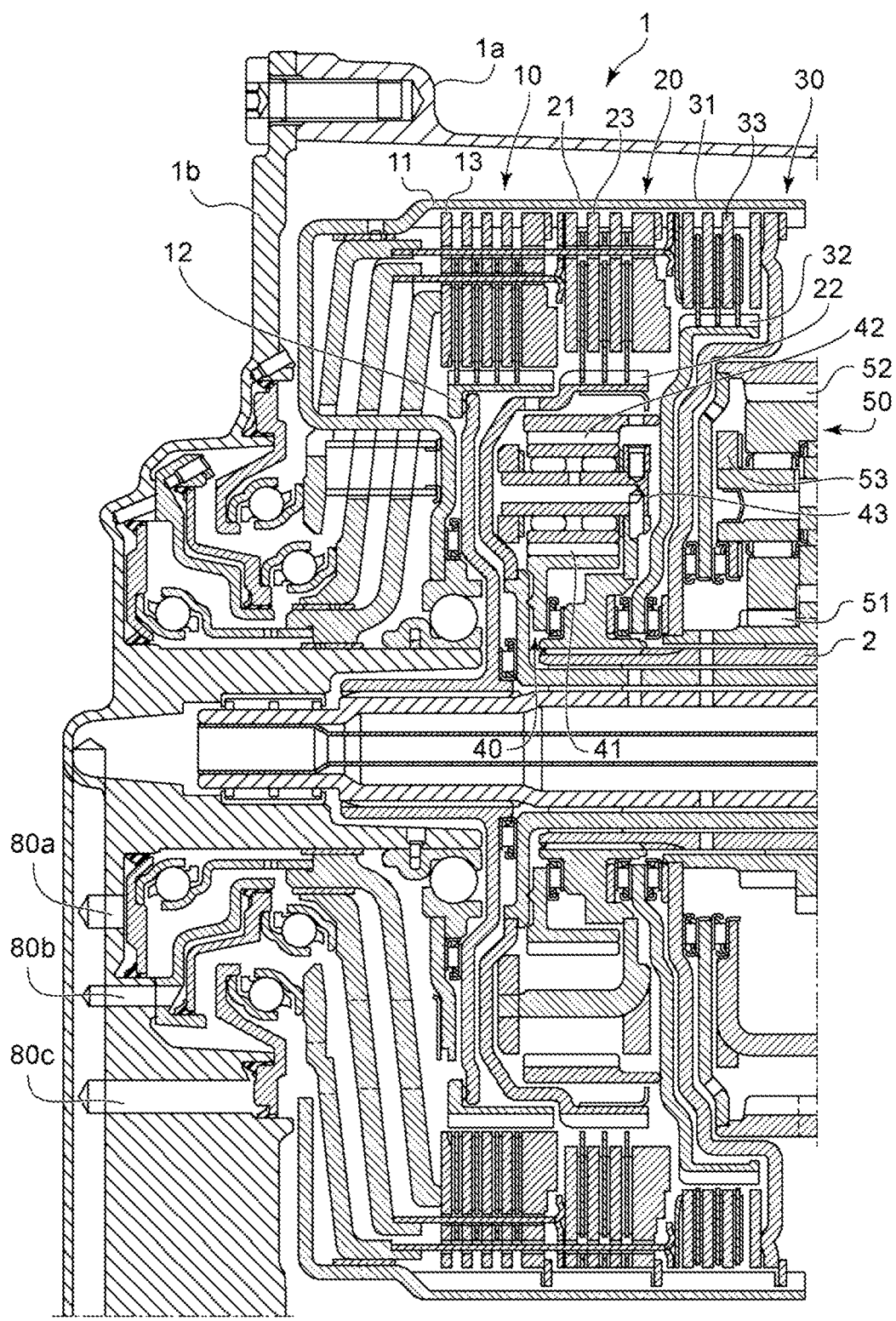
FIG. 1 is a cross-sectional view of a rear portion of an automatic transmission according to an embodiment of the present disclosure.

FIG. 1 illustrates a configuration of an automatic transmission on an opposite side of a drive source (hereinafter, the opposite side of the drive source will be referred to as a rear side or one axial side, and a drive source side will be referred to as a front side or an other axial side). In a rear portion of a transmission case 1 having: a body case 1a; and an end cover 1b that closes an opening at a rear end of the body case 1a, on an input shaft 2 that extends from the drive source side, a first clutch 10 as a one-side clutch, a second clutch 20 as a first other-side clutch, a third clutch 30 as a second other-side clutch, and first and second planetary gear sets 40, 50 are disposed from the rear side. The first clutch 10, the second clutch 20, and the third clutch 30 respectively include a plurality of friction plates 13, 23, 33 that are aligned in an axial direction. The first and second planetary gear sets 40, 50 are aligned in the axial direction.

The first and second planetary gear sets 40, 50 have, as rotary elements, sun gears 41, 51, ring gears 42, 52, and pinion carriers 43, 53, respectively.

The first, second, and third clutches 10, 20, 30 respectively have: drum members 11, 21, 31 that are joined and rotate integrally during engagement; and hub members 12, 22, 32.

The drum member 31 of the third clutch 30 that is located farthest on the other axial side (the drive source side) is connected to the sun gear 51 of the second planetary gear set 50. The hub member 32 of the third clutch 30 is coupled to the ring gear 42 of the first planetary gear set 40.

The drum member 21 of the second clutch 20 is provided on the one axial side of the drum member 31 in the third clutch 30. The drum member 21 extends to the one axial side from the drum member 31 of the third clutch 30 and is integrally formed therewith. The drum member 21 of the second clutch 20 is connected to the sun gear 51 of the second planetary gear set 50 via the drum member 31 of the third clutch 30. The hub member 22 of the second clutch 20 is coupled to a ring gear in another planetary gear set, which is not illustrated.

The drum member 11 of the first clutch 10 is provided on the one axial side of the drum member 21 in the second clutch 20. The drum member 11 of the first clutch 10 extends to the one axial side of the second clutch 20 and is integrally formed with the drum members 21, 31 of the second and third clutches 20, 30. The drum member 11 of the first clutch 10 is connected to the sun gear 51 of the second planetary gear set 50 via the drum members 21, 31 of the second and third clutches 20, 30. The hub member 12 of the first clutch 10 is coupled to the input shaft 2 of the automatic transmission.

Next, a description will be made on configurations of the first, second, and third clutches 10, 20, 30 with reference to FIG. 2 and FIG. 3. FIG. 3 includes exploded perspective views of pistons, the friction plates, and the drum members constituting the first to third clutches 10, 20, 30.

The first, second, and third clutches 10, 20, 30 respectively have, in addition to the drum members 11, 21, 31, the hub members 12, 22, 32, and the plurality of friction plates 13, 23, 33 that are aligned in the axial direction therebetween and are alternately spline-engaged with the drum members 11, 21, 31 and the hub members 12, 22, 32: pistons 14, 24, 34 that are arranged behind (on the one axial side of) these friction plates 13, 23, 33, respectively; and hydraulic chambers 15, 25, 35 that are provided in back portions of the pistons 14, 24, 34, respectively. When an engagement pressure is supplied to any these hydraulic chambers 15, 25, 35, in the clutches 10, 20, 30 to respective one of which the engagement pressure is supplied, respective one of the pistons 14, 24, 34 presses respective one of the friction plates 13, 23, 33 and joins respective one of the drum members 11, 21, 31 to respective one of the hub members 12, 22, 32. In this way, respective one of the clutches 10, 20, 30 is engaged.

The plurality of friction plates 13, 23, 33 in the first, second, and third clutches 10, 20, 30 respectively include: a plurality of outer friction plates 13a, 23a, 33a that are spline-engaged with the drum members 11, 21, 31; and a plurality of inner friction plates 13b, 23b, 33b that are spline-engaged with the hub member 12 and are alternately arranged with the plurality of outer friction plates 13a, 23a, 33a in the axial direction.

The drum member 11 of the first clutch 10 includes: an outer cylindrical section 11a with which the outer friction plate 13a is engaged; an extending section 11b that further extends to the one axial side from an end portion on the one axial side of the outer cylindrical section 11a; a first radial section 11c that extends radially inward from an end portion on the one axial side of the extending section 11b; and an axial section 11d that extends to the other axial side from an inner end portion on a radially inner side of the first radial section 11c; and a second radial section 11e that extends radially inward from an end portion on the other axial side of the axial section 11d.

The first radial section 11c extends along the end cover 1b in a manner to be substantially orthogonal to the axial direction. The axial sections 11d are each formed in a comb tooth shape, are aligned at equally spaced intervals in a circumferential direction, and axially penetrate through holes 14f, 24h, 34c provided in the pistons 14, 24, 34 of the first clutch 10, the second clutch 20, and the third clutch 30, which will be described below, respectively (see FIG. 3).

A portion on the radially inner side of the second radial section 11e is fixed to a boss section 1c, which is provided in the end cover 1b and is projected to the other axial side, via a bearing 11f. A convex section 11g that is projected radially outward is provided in an axial central portion of an outer race 11f1 of the bearing 11f, and is configured that an end surface on the other axial side of the second radial section 11e abuts the convex section 11g.

An inner circumferential surface of an inner race 11f2 of the bearing 11f is press-fitted into the boss section 1c of the end cover 1b. The inner race 11f2 is provided with an engaged section 11h that extends to the one axial side, is engaged with the boss section 1c, and is engaged with a restraining member 1d to restrain axial movement of the bearing 11f.

As illustrated in FIG. 3, in the drum member 11, the second radial section 11e and a group of the outer cylindrical section 11a, the extending section 11b, the first radial section 11c, and the axial section 11d are formed of separate bodies. The drum member 11 is integrated by joining a flange section 11d1 and an end portion on the radially outer side of the second radial section 11e, and the flange section 11d1 is provided in the axial section 11d and extends radially inward from the other axial end portion of the axial section 11d.

The hub member 12 of the first clutch 10 includes: an inner cylindrical section 12a with which an inner friction plate 13b is engaged; a disc section 12b that extends radially inward from an end portion on the one axial side of the inner cylindrical section 12a; and a spline section 12c that extends to the one axial side and the other axial side from an inner end portion of the disc section 12b and is spline-fitted to the input shaft 2.

As illustrated in FIG. 3, a spline section 13a1 that is spline-engaged with the outer cylindrical section 11a is provided on an outer circumferential surface of the outer friction plate 13a, and a spline section 13b1 that is spline-engaged with the inner cylindrical section 12a is provided on an inner circumferential surface of the inner friction plate 13b.

In a radially outer portion of the outer friction plate 13a, a plurality of first through holes 13c and a plurality of second through holes 13d are provided. The first through holes 13c are provided to cause the piston 24 of the second clutch 20 to pass therethrough in the axial direction. The second through holes 13d are provided to cause the piston 34 of the third clutch 30 to pass therethrough in the axial direction.

Each of a set of the plurality of first through holes 13c and a set of the plurality of second through holes 13d is aligned at equally spaced intervals in the circumferential direction, and each of the first through holes 13c is arranged at a different circumferential position from respective one of the second through holes 13d. In other words, a first penetration position, which the piston 24 of the second clutch 20 penetrates, and a second penetration position, which the piston 34 of the third clutch 30 penetrates, in the outer friction plate 13a differ in the circumferential direction. In detail, a circumferentially central portion of each of the first through holes 13c and a circumferentially central portion of each of the second through holes 13d, which is adjacent to respective one of the first through holes 13c, are provided in a state where circumferential positions thereof are misaligned. In this embodiment, a circumferential position of one end portion in the circumferential direction of each of the first through holes 13c overlaps a circumferential position of the other end portion in the circumferential direction of one of the second through holes 13d adjacent to the first through hole 13c. However, the one end portion may not overlap the other end portion.

Figure 2:
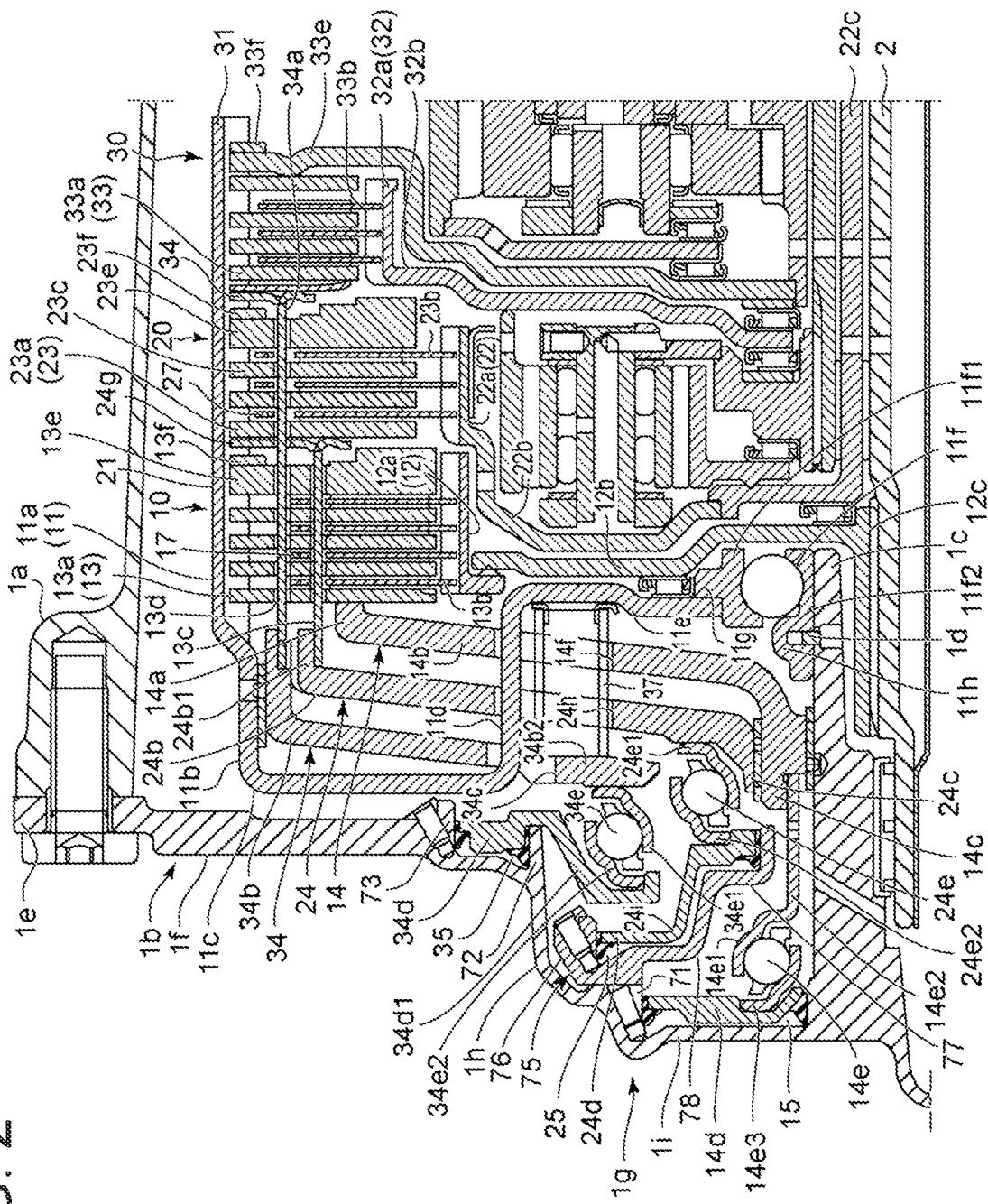
FIG. 2 is an enlarged view of a main section in FIG. 1.
Figure 3:
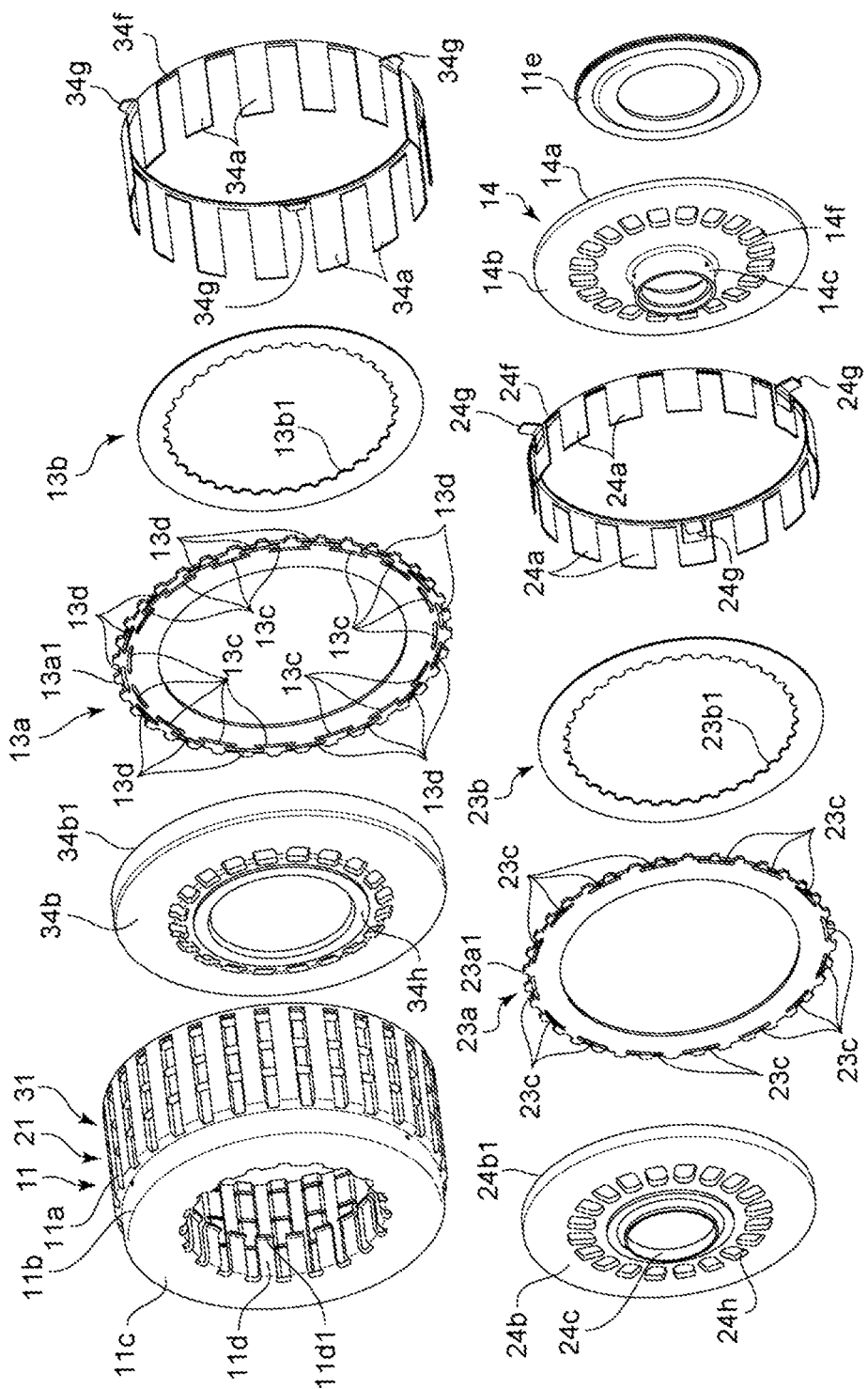
FIG. 3 includes exploded perspective views of drum members, pistons, and friction plates in first to third clutches.

As illustrated in FIG. 2, on an outer circumferential side of the radial position of each of the first through holes 13c and on the outer side of an outer circumference of each of the inner friction plates 13b, a radial position of each of the second through holes 13d is located on a radially inner side of the spline section 13a1.

The piston 14 has: a pressing section 14a that is arranged on the one axial side of the friction plates 13a, 13b and presses the friction plates 13a, 13b during the engagement; a disc-shaped radial section 14b that extends radially inward from the pressing section 14a; a cylindrical section 14c that extends to the one axial side from an inner end portion of the radial section 14b; a disc-shaped pressure-receiving section 14d that includes a pressure-receiving surface for receiving a hydraulic pressure supplied to the hydraulic chamber 15; and a bearing section 14e that is arranged between the cylindrical section 14c and the disc-shaped pressure-receiving section 14d.

The piston 14 is rotatably supported by the boss section 1c, which is provided to protrude in the axial direction from the end cover 1b, via a resin bush, for example, disposed on an inner circumferential surface of the cylindrical section 14c.

The radial section 14b is inclined from the pressure-receiving section 14d side toward the friction plate 13 side. In detail, in a direction from the radially inner side toward the radially outer side, the radial section 14b is inclined from the one axial side to the other axial side. The pressing section 14a overlaps the second radial section 11e of the drum member 11 in the axial direction, and a radially inner portion of the radial section 14b is located on the one axial side of the second radial section 11e of the drum member 11.

In an intermediate portion in the radial direction of the pressing section 14a, the plurality of through holes 14f, each of which penetrates the portion in the axial direction, are aligned in the circumferential direction. At a circumferential position corresponding to the axial section 11d of the drum member 11, each of the through holes 14f is formed to have such a circumferential dimension that the axial section 11d can penetrate the through hole 14f. In each of the through holes 14f, a return spring 37 is arranged to urge the piston 34, which will be described below, to an opposite side of the friction plate direction. Thus, a radial dimension of each of the through holes 14f is set to be larger than a diameter of the return spring 37.

The bearing section 14e is arranged on the one axial side of the cylindrical section 14c. An outer race 14e1 of the bearing section 14e includes an extending section 14e2 that extends to the other axial side along the boss section 1c. An end portion on the other axial side of the extending section 14e2 is connected to an inner circumferential surface of an end portion on the one axial side of the cylindrical section 14c by welding or the like, for example. The disc-shaped pressure-receiving section 14d is arranged on the one axial side of the bearing section 14e and is connected to an inner race 14e3 of the bearing section 14e by joining or the like. The pressure-receiving section 14d and the bearing section 14e are arranged in a concave section 1g, which is provided in the end cover 1b and which will be described below.

The hydraulic chamber 15 and the bearing section 14e are arranged on the radially inner side of the friction plates 13. Similarly, the radial positions of the pressure-receiving section 14d and the pressing section 14a in the piston 14 are offset from each other.

Of the plurality of friction plates 13, the outer friction plate 13a that is located farthest on the other axial side constitutes a retaining member 13e.

An axial dimension (a plate thickness) of the entire retaining member 13e is set to be greater than a plate thickness of each of the other outer friction plates 13a. The retaining member 13e is set such that the plate thickness of a radially inner portion is greater than that of a radially outer portion.

A restraining member 13f that restrains axial movement of each of the friction plates 13 is arranged on the other axial side of the retaining member 13e.

In the first clutch 10, an urging member 17 that is constructed of a conical spring or the like is disposed between each adjacent pair of the outer friction plates 13a, and the urging members 17 are provided to elastically urge the adjacent outer friction plates 13a in separating directions. Each of these urging members 17 is arranged on the outer circumferential side of the inner friction plate 13b.

The urging members 17 are provided such that a clutch clearance is divided into each adjacent pair of the outer friction plates 13a. In addition, each of these urging members 17 also functions as a return spring that causes the piston 14 to move to the opposite side of the friction plates.

As illustrated in FIG. 2, the drum member 21 of the second clutch 20 is formed in a cylindrical shape, and the outer friction plates 23a are engaged with a portion on an inner circumferential side of the drum member 21. The drum member 21 extends to the other axial side from the outer cylindrical section 11a of the first clutch 10 and is integrally formed therewith.

The hub member 22 includes: an inner cylindrical section 22a with which the inner friction plate 23b is engaged; a disc section 22b that extends radially inward from an end portion on the one axial side of the inner cylindrical section 22a; and a power transmission section 22c that extends to the one axial side from an inner end portion of the disc section 22b and is coupled to another rotary element.

As illustrated in FIG. 3, a spline section 23a1 that is spline-engaged with an outer cylindrical section 21a is provided on an outer circumferential surface of the outer friction plate 23a, and a spline section 23b1 that is spline-engaged with the inner cylindrical section 22a is provided on an inner circumferential surface of the inner friction plate 23b.

In a radially outer portion of the outer friction plate 23a, plurality of third through holes 23c are provided to cause the piston 34 of the third clutch 30, which will be described below, to pass therethrough in the axial direction.

The plurality of third through holes 23c are aligned at equally spaced intervals in the circumferential direction and are provided such that a circumferential position of each of the third through holes 23c corresponds to a circumferential position of respective one of the second through holes 13d. Each of the third through holes 23c is arranged such that the circumferential position thereof matches the circumferential position of respective one of the second through holes 13d.

A radial position of each of the third through holes 23c is located on the outer side of an outer circumference of the inner friction plate 23b and is located on the radially inner side of the spline section 23a1. A radial position of the outer circumference of the inner friction plate 23b is located on the radially outer side of the first through hole 13c (see FIG. 2).

The piston 24 has: a pressing section 24a that is arranged on the one axial side of the plurality of friction plates 23 of the second clutch 20 and presses the friction plates 23 during the engagement; a disc-shaped radial section 24b that extends radially inward from an end portion on the one axial side of the pressing section 24a; a cylindrical section 24c that further extends to the one axial side from an inner end portion of the radial section 24b; a pressure-receiving section 24d that includes a pressure-receiving surface for receiving the hydraulic pressure supplied to the hydraulic chamber 25; and a bearing section 24e that is arranged between the cylindrical section 24c and the pressure-receiving section 24d.

The piston 24 is supported to be relatively rotatable and axially slidable by an outer circumferential surface of the piston 14 in the first clutch 10 via a resin bush, for example, which is disposed between an inner circumferential surface of the cylindrical section 24c and an outer circumferential surface of the cylindrical section 14c of the piston 14.

The pressing section 24a is arranged on the radially outer side of the pressing section 14a of the first clutch 10, and a portion on the one axial side of the pressing section 24a overlaps the pressing section 14a of the first clutch 10 in the axial direction.

The pressing section 24a axially extends from the one axial side of the friction plates 23 in the second clutch 20 to the one axial side of the friction plates 13 in the first clutch 10, and is formed in a comb tooth shape. The pressing sections 24a are aligned at equally spaced intervals in the circumferential direction, and other axial end portions of the plurality of pressing sections 24a are coupled by a ring-shaped coupling section 24f. Each of the pressing sections 24a is provided in a manner to correspond to respective one of the first through holes 13c and penetrates respective one of the first through holes 13c.

Of the plurality of pressing sections 24a, at least three of the pressing sections 24a are each provided with a cut raised portion 24g that is formed by cutting a part of the pressing sections 24a to extend radially outward. The cut raised portions 24g are provided at equally spaced intervals in the circumferential direction, are spline-engaged with the drum member 21, and thus have a function of stopping rotation with respect to the drum member 21.

An end portion on the other axial side of the pressing section 24a is connected to a flange section 24b1 from the radially inner side by welding, for example. The flange section 24b1 is projected to the other axial side from an end portion on the radially outer side of the radial section 24b. Similar to the radial section 14b of the first clutch 10, in the direction from the radially inner side toward the radially outer side, the radial section 24b is inclined from the one axial side to the other axial side. The radial section 24b is inclined from the pressure-receiving section 24d side toward the friction plate 13 side. The radial section 24b is arranged in a manner to align with the radial section 14b of the first clutch 10 in the axial direction. On the radially outer side, the radial section 24b overlaps the cylindrical section 14c of the first clutch 10 in the axial direction.

In a radially intermediate portion of the radial section 24b, the plurality of through holes 24h, each of which penetrates the radial section 24b in the axial direction, are aligned in the circumferential direction. The through holes 24h are aligned at circumferential positions corresponding to the axial section 11d of the drum member 11. Similar to the piston 14 of the first clutch 10, at the circumferential position corresponding to the axial section 11d of the drum member 11, each of the through holes 24h is set to have such a circumferential dimension that the axial section 11d can penetrate the through hole 24h. In each of the through holes 24h, the return spring 37 is arranged to urge the piston 34, which will be described below, to the opposite side of the friction plate direction. Thus, a radial dimension of each of the through holes 24h is set to be larger than the diameter of the return spring 37.

The bearing section 24e is arranged on the one axial side of the radial section 24b. An inner race 24e1 of the bearing section 24e is connected to a surface on a radially inner side and on the one axial side of the radial section 24b by joining or the like. The pressure-receiving section 24d is arranged on the one axial side of the bearing section 24e and is connected to an outer race 24e2 of the bearing section 24e by joining or the like.

The pressure-receiving section 24d is formed with a step 24i, which is inclined radially outward, from a portion that is located on the radially inner side and abuts the outer race 24e2 toward the one axial side. The step 24i is located on the radially outer side of the bearing section 14e of the first clutch 10 and overlaps the bearing section 14e in the axial direction. The pressure-receiving section 24d and the hydraulic chamber 25 are arranged in the concave section 1g, which is provided in the end cover 1b and which will be described below.

The bearing section 24e is arranged on the other axial side of the bearing section 14e of the first clutch 10. The bearing section 24e and the bearing section 14e of the first clutch 10 are arranged in a manner to at least partially overlap each other in the radial direction. In detail, a radially inner portion of the inner race 24e1 of the bearing section 24e radially overlaps a radially outer portion of the outer race 14e1 of the first clutch 10.

The hydraulic chamber 25 and the bearing section 24e are arranged on the radially inner side of the friction plates 23. Similarly, the radial positions of the pressing section 24a and the pressure-receiving section 24d in the piston 24 are offset from each other. The hydraulic chamber 25 is arranged between the bearing section 24e and the bearing section 14e of the first clutch 10.

Similar to the first clutch 10, of the plurality of friction plates 23, the outer friction plate 23a that is located farthest on the other axial side constitutes a retaining member 23e.

An axial dimension (a plate thickness) of the entire retaining member 23e is set to be greater than a plate thickness of each of the other outer friction plates 23a. The retaining member 23e is set such that in a radially inner portion, in particular, a portion in which the piston 24 abuts the outer friction plate 23a, has the greater plate thickness than a radially outer portion.

A restraining member 23f that restrains axial movement of each of the friction plates 23 is arranged on the other axial side of the retaining member 23e.

In the second clutch 20, an urging member 27 that is constructed of the conical spring or the like is disposed between each adjacent pair of the outer friction plates 23a, and the urging members 27 are provided to elastically urge the adjacent outer friction plates 23a in separating directions. Each of these urging members 27 is arranged on the outer circumferential side of the inner friction plate 23b.

The urging members 27 are provided such that a clutch clearance is divided into each adjacent pair of the outer friction plates 23a. In addition, each of these urging members 27 also functions as a return spring that causes the piston 24 to move to the opposite side of the friction plates.

As illustrated in FIG. 2, the drum member 31 of the third clutch 30 is formed in a cylindrical shape, and the outer friction plates 33a are engaged with a portion on the inner circumferential side of the drum member 31. The drum member 31 extends to the other axial side from the drum member 21 of the second clutch 20 and is integrally formed therewith. In other words, the outer cylindrical section 11a of the first clutch 10, the drum member 21 of the second clutch 20, and the drum member 31 of the third clutch 30 are integrally formed.

The hub member 32 includes: an inner cylindrical section 32a with which the inner friction plates 33b are engaged; and a disc section 32b that extends radially inward from an end portion on the one axial side of the inner cylindrical section 32a.

A spline section that is spline-engaged with an outer cylindrical section 31a is provided on an outer circumferential surface of the outer friction plate 33a, and a spline section that is spline-engaged with the inner cylindrical section 32a is provided on an inner circumferential surface of the inner friction plate 33b.

The piston 34 has: a pressing section 34a that is arranged on the one axial side of the plurality of friction plates 33 of the third clutch 30 and presses the friction plates 33 during the engagement; a disc-shaped radial section 34b that extends radially inward from an end portion on the one axial side of the pressing section 34a; a pressure-receiving section 34d that includes a pressure-receiving surface for receiving the hydraulic pressure supplied to the hydraulic chamber 35; and a bearing section 34e that is arranged between the radial section 34b and the pressure-receiving section 34d.

The pressing section 34a is arranged on the radially outer side of the pressing section 24a of the second clutch 20, and the pressing section 34a and the pressing section 24a of the second clutch 20 overlap each other in the axial direction. The pressing section 34a axially extends from the one axial side of the friction plates 33 in the third clutch 30 to the one axial side of the friction plates 13 in the first clutch 10, and is formed in the comb tooth shape. The pressing sections 34a are aligned at equally spaced intervals in the circumferential direction, and other axial end portions of the plurality of pressing sections 34a are coupled by a ring-shaped coupling section 34f. Each of the pressing sections 34a is provided in a manner to correspond to respective one of the second through holes 13d and respective one of the third through holes 23c, and penetrates respective one of the second through holes 13d and respective one of the third through holes 23c.

A cut raised portion 34g that is formed to extend radially outward from the coupling section 34f is provided at at least three positions between adjacent pairs of the plurality of pressing sections 34a. The cut raised portions 34g are provided at equally spaced intervals in the circumferential direction, are spline-engaged with the drum member 31, and thus have a function of stopping rotation with respect to the drum member 31.

An end portion on the one axial side of the pressing section 34a is connected to a flange section 34b1 from the radially inner side by welding, for example. The flange section 34b1 is projected to the other axial side from an end portion on the radially outer side of the radial section 34b. Similar to the radial sections 14b, 24b of the first and second clutches 10, 20, in the direction from the radially inner side toward the radially outer side, the radial section 34b is inclined from the one axial side to the other axial side. The radial section 34b is inclined from the pressure-receiving section 34d side toward the friction plate 13 side. The radial section 34b is arranged in a manner to align with the radial section 24b of the second clutch 20 in the axial direction. On the radially outer side, the radial section 34b overlaps the cylindrical sections 14c, 24c of the first and second clutches 10, 20 in the axial direction.

In a radially intermediate portion of the radial section 34b, the plurality of through holes 34c, each of which penetrates the radial section 34b in the axial direction, are aligned in the circumferential direction. The through holes 34c are aligned at circumferential positions corresponding to the axial section 11d of the drum member 11. Similar to the piston 14 of the first clutch 10, at the circumferential position corresponding to the axial section 11d of the drum member 11, each of the through holes 34c is set to have such a circumferential dimension that the axial section 11d can penetrate the through hole 34c.

A seat section 34b2 is provided on an inner side of the through hole 34c. An end portion on the one axial side of the return spring 37, which urges the piston 34 of the third clutch 30 to the opposite side of the friction plate direction and which will be described below, is seated on the seat section 34b2.

In the third clutch 30, the return spring 37 that is constructed of a coil spring or the like is disposed between the seat section 34b2 and the second radial section 11e of the drum member 11, and the return spring 37 is provided to elastically urge the piston 34 to the opposite side of the friction plates. The return spring 37 axially penetrates the through holes 14f, 24h of the first and second clutches 10, 20.

The bearing section 34e is arranged on the one axial side of the radial section 34b. An inner race 34e1 of the bearing section 34e is connected to an opposite surface of the radial section 34b from the seat section 34b2 (a surface on the radially inner side and on the one axial side) by joining or the like. The pressure-receiving section 34d is arranged at a position that is located on the radially outer side of the bearing section 34e and overlaps the bearing section 34e in the axial direction. The pressure-receiving section 34d includes a connected portion 34d1 that extends to the one axial side of the bearing section 34e while further extending radially inward from an end portion on the radially inner side of the pressure-receiving section 34d and that is connected to an outer race 34e2 of the bearing section 34e by joining or the like.

The bearing section 34e and the connected portion 34d1 are arranged in the concave section 1g, which will be described below, in the end cover 1b. The connected portion 34d1 is arranged between a surface on the radially outer side of the step 24i of the second clutch 20 and a surface on an inner circumferential side of the concave section 1g. The bearing section 34e is arranged on the other axial side of the bearing section 14e of the first clutch 10 and on the one axial side of the bearing section 24e of the second clutch 20. The bearing section 34e is arranged on the radially inner side of the hydraulic chamber 35 and the axial section 11d of the drum member 11.

The hydraulic chamber 35 and the bearing section 34e are arranged on the radially inner side of the friction plates 33. Similarly, the radial positions of the pressing section 34a and the pressure-receiving section 34d in the piston 34 are offset from each other. The hydraulic chamber 35 is arranged on the radially outer side of the bearing section 34e and overlaps the bearing section 34e in the axial direction.

A power transmission member 33e is spline-engaged with a portion on the other axial side of one of the plurality of friction plates 33, and connects the drum member 31 to the sun gear 51 of the second planetary gear set 50. In the third clutch 30, the power transmission member 33e has a function as the retaining member. A restraining member 33f that restrains axial movement of each of the friction plates 33 is arranged on the other axial side of the power transmission member 33e.

The hydraulic chambers 15, 25, 35 of the first, second, and third clutches 10, 20, 30 are formed in the end cover 1b of the transmission case 1, and a description will be made on configurations of these hydraulic chambers 15, 25, 35.

The end cover 1b includes: a fixed section 1e that is fixed to an end portion on the radially outer side of the body case 1a; an outer vertical wall section 1f that extends radially inward from the fixed section 1e and is located on the radially outer side; and the concave section 1g that is recessed to the one axial side on the radially inner side of the outer vertical wall section 1f. The concave section 1g is configured to include: a cylindrical section 1h that extends to the one axial side from an inner end portion of the outer vertical wall section 1f; a bottom section 1i that extends radially inward from an end portion on the one axial side of the cylindrical section 1h; and the boss section 1c that extends forward along a rotation centerline from an inner end portion side of the bottom section 1i.

The end cover 1b includes: a first cylinder section 71, a second cylinder section 72, and a third cylinder section 73 in cylindrical shapes. The first cylinder section 71 extends to the other axial side from a surface on the other axial side of the cylindrical section 1h, the second cylinder section 72 extends to the other axial side from the bottom section 1i, and the third cylinder section 73 extends to the other axial side from a surface on the other axial side of the outer vertical wall section 1f.

At a position between the first cylinder section 71 and the second cylinder section 72 in the bottom section 1i, a hydraulic chamber component 75 that constitutes the hydraulic chamber 25 of the second clutch 20 is fixed by a bolt, which is not illustrated, or the like. The hydraulic chamber component 75 has an outer cylindrical section 76 on the radially outer side, an inner cylindrical section 77 on the radially inner side, and a vertical wall section, an end portion on the one axial side of which couples the outer cylindrical section 76 and the inner cylindrical section 77. The outer cylindrical section 76 extends to a position near the connected portion 34d1 of the third clutch 30. The inner cylindrical section 77 has a step 78 along the pressure-receiving section 24d of the second clutch 20 such that a portion on the one axial side is located on the radially outer side of a portion on the other axial side. The inner cylindrical section 77 and the pressure-receiving section 24d are arranged to overlap each other in the axial direction.

The pressure-receiving section 14d of the piston 14 in the first clutch 10 is fitted between an outer circumferential surface of the boss section 1c and an inner circumferential surface of the first cylinder section 71, the pressure-receiving section 24d of the piston 24 in the second clutch 20 is fitted between an inner circumferential surface of the outer cylindrical section 76 and an outer circumferential surface of the inner cylindrical section 77 in the hydraulic chamber component 75, and the pressure-receiving section 34d of the piston 34 in the third clutch 30 is fitted between an outer circumferential surface of the second cylinder section 72 and an inner circumferential surface of the third cylinder section 73.

The hydraulic chamber 15 of the first clutch 10 is formed in an oil sealed state by the outer circumferential surface of the boss section 1c, a surface on the other axial side of the bottom section 1i, the inner circumferential surface of the first cylinder section 71, and a back surface of the pressure-receiving section 14d. The hydraulic chamber 25 of the second clutch 20 is formed in the oil sealed state by the outer circumferential surface of the inner cylindrical section 77 of the hydraulic chamber component 75, a surface on the other axial side of the vertical wall section 75a, the inner circumferential surface of the outer cylindrical section 76, and a back surface of the pressure-receiving section 24d. The hydraulic chamber 35 of the third clutch 30 is formed in the oil sealed state by a surface on the other axial side of the outer vertical wall section 1f, the outer circumferential surface of the second cylinder section 72, the inner circumferential surface of the third cylinder section 73, and a back surface of the pressure-receiving section 34d. The end cover 1b is provided with air release sections that communicate with upper end portions of the hydraulic chambers 15, 25, 35 and are used to release air accumulated in the hydraulic chambers 15, 25, 35, respectively.

In addition, engagement hydraulic oil supply passages 80a, 80b, 80c, through which engagement hydraulic oil is respectively supplied to the hydraulic chambers 15, 25, 35 of the first, second, and third clutches 10, 20, 30, are provided at different circumferential positions in the end cover 1b.

Next, a description will be made on operation of the automatic transmission according to this embodiment. First, when the engagement pressure (the engagement hydraulic oil) is supplied to the hydraulic chamber 15 of the first clutch 10 via the engagement hydraulic oil supply passage 80a, the first clutch 10 is engaged, and the input shaft 2 is joined to the sun gear 51 of the second planetary gear set 50.

When the engagement pressure is supplied to the hydraulic chamber 25 of the second clutch 20 via the engagement hydraulic oil supply passage 80b, the second clutch 20 is engaged, and the ring gear of the other planetary gear set, which is not illustrated, is joined to the sun gear 51 of the second planetary gear set 50.

When the engagement pressure is supplied to the hydraulic chamber 35 of the third clutch 30 via the engagement hydraulic oil supply passage 80c, the third clutch 30 is engaged, and the sun gear 51 of the second planetary gear set 50 is joined.

In particular, in this automatic transmission, the friction plates 13, 23, 33 of the first, second, and third clutches 10, 20, 30 are aligned in the axial direction. Thus, compared to a case where the friction plates 13, 23, 33 are superimposed in the radial direction, it is possible to suppress an increase in the radial dimension.

The pistons 14, 24, 34 are divided into the pressing sections 14a, 24a, 34a and the radial sections 14b, 24b, 34b that are rotatable and the fixed pressure-receiving sections 14d, 24d, 34d, respectively. The hydraulic pressures that are applied to the pressure-receiving sections 14d, 24d, 34d are transmitted to the pressing sections 14a, 24a, 34a via the bearing sections 14e, 24e, 34e, respectively. Thus, the hydraulic chambers 15, 25, 35 do not rotate. In this way, such a case does not occur that, due to rotation of the hydraulic chambers 15, 25, 35, centrifugal forces applied to the hydraulic oil in the hydraulic chambers 15, 25, 35 are generated. Thus, cancellation chambers that cancel the centrifugal forces are unnecessary, and it is possible to suppress an increase in the axial dimension to secure the cancellation chambers.

The pressure-receiving sections 14d, 24d, 34d and the bearing sections 14e, 24e, 34e are aggregated and arranged on the radially inner side of the pressing sections 14a, 24a, 34a. Accordingly, at the radial position where the friction plates 13, 23, 33 are arranged, only the radial sections 14b, 24b, 34b of the pistons 14, 24, 34 can be arranged in parallel on the one axial side. In this way, compared to a case where the bearing sections 14e, 24e, 34e are arranged between the pressing sections 14a, 24a, 34a and the friction plates 13, respectively, an axial dimension of a portion in which the friction plates 13, 23, 33 are arranged can easily be reduced.

As a result, in the automatic transmission including the plurality of clutches 10, 20, 30, it is possible to suppress the increase in the axial dimension of the plurality of clutches.

The bearing sections 14e, 24e, 34e are arranged on the radially inner side of the pressing sections 14a, 24a, 34a of the pistons 14, 24, 34, respectively. Thus, compared to a case where the bearing sections 14e, 24e, 34e are arranged between the pressing sections 14a, 24a, 34a and the friction plates 13, respectively, circumferential velocities of the bearing sections 14e, 24e, 34e are reduced. As a result, it is possible to suppress running out of the oil in the bearing sections 14e, 24e, 34e, and the like.

As described above, the piston 24 of the second clutch 20 axially penetrates the outer friction plate 13a of the first clutch 10, the piston 34 of the third clutch 30 axially penetrates the outer friction plate 13a of the first clutch 10 and the outer friction plate 23a of the second clutch 20. Accordingly, it is possible to press the friction plates 23, 33 by the pistons 24, 34, each of which is arranged on the one axial side of the friction plates 13, in the second and third clutches 20, 30 while arranging the friction plates 13, 23, 33 of the first, second, and third clutches 10, 20, 30 in parallel in the axial direction.

As described above, an inner end portion of the drum member 11 of the first clutch 10 is supported by the transmission case 1 via the bearing 11f. Accordingly, an axial load that the drum member 11 receives from the piston 14 via the plurality of friction plates 13 is transmitted to the inner end portion of the drum member 11 via the outer cylindrical section 11a, which extends in the axial direction, in the drum member 11. The load that is transmitted to the inner end portion of the drum member 11 can be received by the transmission case 1 via the bearing 11f.

Accordingly, the axial load that is applied to the drum member 11 is not transmitted to another rotary element. Thus, it is possible to eliminate an arrangement space for a bearing or the like that is necessary when the axial load is transmitted to the other rotary element. More specifically, in the case where the axial load is transmitted to the other rotary element, the axial load, which has been transmitted to the other rotary element, is transmitted to the transmission case 1 while the bearing or the like is arranged to bear the axial load. However, with this configuration, the axial load that is applied to the drum member 11 is not transmitted to the other rotary element. Thus, there is no need to arrange an unnecessary load bearing member.

The axial section 11d of the drum member 11 of the first clutch 10 penetrates the radial sections 14b, 24b, 34b of the pistons 14, 24, 34. Accordingly, compared to a case where the drum member 11 only has the radial section that extends in the radial direction from the cylindrical section 11a, it is possible to incline the radial sections 14b, 24b, 34b of the pistons 14, 24, 34 from the other axial side to the one axial side in a direction from the radially outer side toward the radially inner side within a specified axial dimension.

In this way, for example, compared to a case where the radial sections 14b, 24b, 34b of the pistons 14, 24, 34 extend along the radial direction in a manner to be orthogonal to the axial direction, an angle defined by each of the pressing sections 14a, 24a, 34a and respective one of the radial sections 14b, 24b, 34b can be increased. Thus, bending deformation of the pressing sections 14a, 24a, 34a of the pistons 14, 24, 34 can easily be suppressed.

The urging members 27, 37, which respectively urge the pistons 24, 34 to the one axial side, are arranged between each adjacent pair of the outer friction plates 23a, 33a of the second clutch 20 and the third clutch 30. Thus, compared to a case where the return spring is arranged on the one axial side, the axial dimension is reduced.

The first penetration position, at which the piston 24 of the second clutch 20 penetrates the friction plates 13 of the first clutch 10, and the second penetration position, at which the piston 34 of the third clutch 30 penetrates the friction plates 13 of the first clutch 10, are arranged to be misaligned in the circumferential direction. Thus, compared to a case where the first through holes 13c and the second through holes 13d provided in the friction plates 13 are provided at the same circumferential positions, rigidity of the friction plates 13 can easily be secured.

As it has been described so far, according to this automatic transmission, the axial dimension of the entire transmission can effectively be reduced. For example, also in the case where the planetary gear set is added to increase the number of gear shift stages, a favorable mountability is obtained. In particular, in the case of a transverse-mounted automatic transmission that is arranged in an engine compartment such that an axial direction thereof is oriented to a vehicle width direction and that has a strictly limited axial dimension, the required mountability is obtained.

In the embodiment that has been described so far, the plurality of friction plates 13, 23, 33 of the three clutches, which are the first, second, and third clutches 10, 20, 30, are arranged in parallel in the axial direction. However, a similar configuration can be obtained, for example, when the plurality of friction plates of two clutches such as the first and second clutches 10, 20 are arranged in parallel in in the axial direction. Thus, the similar effects can be exerted.

INDUSTRIAL APPLICABILITY

As it has been described so far, according to the present invention, it is possible to provide the automatic transmission which includes the plurality of clutches and in which the axial dimension of the plurality of clutches is reduced. Therefore, the prevent invention can suitably be used in a manufacturing industry field of this type of the automatic transmission or a vehicle on which this type of the automatic transmission is mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 1 transmission case
2 input shaft (power transmission shaft)
10 one-side clutch
11, 21, 31 drum member
11a outer drum section
11c first radial section
11d axial section
11e second radial section (inner drum section)
11f bearing
12, 22, 32 hub member
13 plurality of one-side friction plates
13c first through hole
13d second through hole
14, 24, 34 piston
14a, 24a, 34a pressing section
14b, 24b, 34b radial section
14d, 24d, 34d pressure-receiving section
14e, 24e, 34e bearing section
15, 25, 35 hydraulic chamber
17, 27 urging member
20 first other-side clutch (other-side clutch)
23 plurality of other-side friction plates
30 second other-side clutch (other-side clutch)

The invention claimed is:

1. An automatic transmission comprising, on an axis of a power transmission shaft:
  a one-side clutch that includes a plurality of friction plates arranged on one side in an axial direction; and
  an other-side clutch that includes, on another side in the axial direction of the plurality of friction plates, a plurality of friction plates aligned in the axial direction, wherein
  each of the one-side clutch and the other-side clutch respectively includes:
    a drum member with which the plurality of friction plates are engaged in an axially slidable manner;
    a hub member with which the plurality of friction plates are engaged in the axially slidable manner on a radially inner side of the drum member;
    a piston that presses the plurality of friction plates from the one side in the axial direction; and
    a hydraulic chamber to which hydraulic oil used to urge the piston in a direction toward the plurality friction plates is supplied,
  each of the pistons of the one-side clutch and the other-side clutch respectively includes:
    a pressing section that extends in the axial direction to press the plurality of friction plates;
    a radial section that extends radially inward from the one side in the axial direction of the pressing section;
    a pressure-receiving section that receives a pressure of the hydraulic oil supplied to the hydraulic chamber; and
    a bearing section that is arranged between the radial section and the pressure-receiving section,
  the pressing section of the one-side clutch and the pressing section of the other-side clutch are arranged to overlap each other in the axial direction,
  on the one side in the axial direction of the plurality of friction plates of the one-side clutch, the radial section of the one-side clutch and the radial section of the other-side clutch are arranged in parallel in the axial direction,
  the pressure-receiving section of the one-side clutch, the pressure-receiving section of the other-side clutch, the bearing section of the one-side clutch, and the bearing section of the other-side clutch are arranged on a radially inner side of the pressing section,
  the other-side clutch is a first other-side clutch that is arranged on the one-side clutch side, and
  the automatic transmission further includes a second other-side clutch that is arranged on the other side in the axial direction of the first other-side clutch.

2. The automatic transmission according to claim 1, wherein the piston of the other-side clutch penetrates the plurality of friction plates of the one-side clutch in the axial direction.

3. The automatic transmission according to claim 2, wherein
  the drum member of the one-side clutch includes a drum radial section that extends radially inward, and
  an end portion of the drum radial section is fixed to a transmission case via a bearing.

4. The automatic transmission according to claim 3, wherein
  the drum member of the one-side clutch includes:
    a cylindrical section with which the plurality of one-side friction plates are engaged;
    a first radial section that extends radially inward from an end portion on the one side in the axial direction of the cylindrical section;
    an axial section that extends to the other side in the axial direction from an end portion on the radially inner side of the first radial section; and
    a second radial section that further extends radially inward from an end portion on the other side in the axial direction of the axial section, and
  the axial section penetrates the radial section of the piston.

5. The automatic transmission according to claim 4, wherein an urging member that urges the piston to the one side in the axial direction is arranged between an adjacent pair of outer friction plates engaged with the drum member of the other-side clutch.

6. The automatic transmission according to claim 1, wherein a first penetration position, at which the piston of the first other-side clutch penetrates the plurality of friction plates of the one-side clutch, and a second penetration position, at which the piston of the second other-side clutch penetrates the plurality of friction plates of the one-side clutch, are misaligned in a circumferential direction.

7. The automatic transmission according to claim 1, wherein the piston of the other-side clutch penetrates the plurality of friction plates of the one-side clutch in the axial direction.

8. The automatic transmission according to claim 7, wherein
  the drum member of the one-side clutch includes:
    a cylindrical section with which the plurality of one-side friction plates are engaged;
    a first radial section that extends radially inward from an end portion on the one side in the axial direction of the cylindrical section;

an axial section that extends to the other side in the axial direction from an end portion on the radially inner side of the first radial section; and a second radial section that further extends radially inward from an end portion on the other side in the axial direction of the axial section, and the axial section penetrates the radial section of the piston.

9. The automatic transmission according to claim 7, wherein an urging member that urges the piston to the one side in the axial direction is arranged between an adjacent pair of outer friction plates engaged with the drum member of the other-side clutch.

10. The automatic transmission according to claim 1, wherein the drum member of the one-side clutch includes a drum radial section that extends radially inward, and an end portion of the drum radial section is fixed to a transmission case via a bearing.

11. The automatic transmission according to claim 10, wherein the drum member of the one-side clutch includes:

a cylindrical section with which the plurality of one-side friction plates are engaged;

a first radial section that extends radially inward from an end portion on the one side in the axial direction of the cylindrical section;

an axial section that extends to the other side in the axial direction from an end portion on the radially inner side of the first radial section; and a second radial section that further extends radially inward from an end portion on the other side in the axial direction of the axial section, and the axial section penetrates the radial section of the piston.

12. The automatic transmission according to claim 10, wherein an urging member that urges the piston to the one side in the axial direction is arranged between an adjacent pair of outer friction plates engaged with the drum member of the other-side clutch.

13. The automatic transmission according to claim 1, wherein the drum member of the one-side clutch includes:

a cylindrical section with which the plurality of one-side friction plates are engaged;

a first radial section that extends radially inward from an end portion on the one side in the axial direction of the cylindrical section;

an axial section that extends to the other side in the axial direction from an end portion on the radially inner side of the first radial section; and a second radial section that further extends radially inward from an end portion on the other side in the axial direction of the axial section, and the axial section penetrates the radial section of the piston.

14. The automatic transmission according to claim 13, wherein an urging member that urges the piston to the one side in the axial direction is arranged between an adjacent pair of outer friction plates engaged with the drum member of the other-side clutch.

15. The automatic transmission according to claim 1, wherein an urging member that urges the piston to the one side in the axial direction is arranged between an adjacent pair of outer friction plates engaged with the drum member of the other-side clutch.

* * * * *